United States Patent
Erden et al.

(10) Patent No.: US 11,158,338 B1
(45) Date of Patent: Oct. 26, 2021

(54) MULTI-ACTUATOR DATA STORAGE SYSTEM

(71) Applicant: Seagate Technology LLC, Fremont, CA (US)

(72) Inventors: Mehmet Fatih Erden, Saint Louis Park, MN (US); Steven Douglas Granz, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/024,224

(22) Filed: Sep. 17, 2020

Related U.S. Application Data (62) Division of application No. 16/459,765, filed on Jul. 2, 2019, now Pat. No. 10,818,317.

(51) Int. Cl.
*G11B 5/09* (2006.01)
*G11B 5/596* (2006.01)
*G11B 19/04* (2006.01)
*G11B 5/60* (2006.01)
*G11B 5/48* (2006.01)
*G11B 5/00* (2006.01)

(52) U.S. Cl.
CPC ........ *G11B 5/59633* (2013.01); *G11B 5/4813* (2013.01); *G11B 5/6005* (2013.01); *G11B 19/044* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,343,347 A | 8/1994 | Gilovich |
| 5,805,386 A | 9/1998 | Faris |
| 5,985,163 A | 11/1999 | Cha et al. |
| 5,986,851 A | 11/1999 | Angelo et al. |
| 6,104,562 A * | 8/2000 | Ottesen .................. G11B 5/012 360/316 |
| 6,317,282 B1 | 11/2001 | Nam |

(Continued)

OTHER PUBLICATIONS

Feist, Jason, "Multi Actuator Technology: A New Performance Breakthrough", https://blog.seagate.com/craftsman-ship/multi-actuator-technology-a-new-performance-breakthrough/, Seagate blog, © 2018, 7 pages.

(Continued)

*Primary Examiner* — Peter Vincent Agustin
(74) *Attorney, Agent, or Firm* — Westman, Champlin & Koehler, P.A.

(57) ABSTRACT

A data storage device includes a data storage medium having a data storage surface. The data storage device also includes a first actuator having a first attached slider with a writer configured to write data on the data storage surface. The writer has a media-confronting surface covered by a first non-magnetic overcoat having a first thickness. The data storage device further includes a second actuator having a second attached slider with at least one user-data reader configured to read user data from the data storage surface and no writer for writing data on the data storage surface. The at least one user-data reader has a media-confronting surface covered by a second non-magnetic overcoat having a second thickness that is less than the first thickness of the first non-magnetic overcoat.

16 Claims, 9 Drawing Sheets

(56) References Cited

U.S. PATENT DOCUMENTS

| | | | |
|---|---|---|---|
| 6,646,828 B1* | 11/2003 | Sasaki | B82Y 10/00 360/123.42 |
| 7,054,093 B1* | 5/2006 | Anderson | G11B 5/00826 360/75 |
| 7,502,205 B1 | 3/2009 | Hurtado et al. | |
| 7,710,683 B2 | 5/2010 | Craig et al. | |
| 7,898,765 B2 | 3/2011 | Hachisuka | |
| 9,324,351 B2 | 4/2016 | Kong et al. | |
| 9,659,587 B1* | 5/2017 | Khamnualthong | G11B 5/3106 |
| 9,666,229 B1 | 5/2017 | Kaddeche | |
| 9,792,935 B2 | 10/2017 | Rejda et al. | |
| 9,805,749 B1* | 10/2017 | Lee | G11B 5/4833 |
| 9,911,442 B1 | 3/2018 | Kharisov et al. | |
| 10,037,779 B1 | 7/2018 | Mendonsa et al. | |
| 10,049,689 B2 | 8/2018 | Stephan et al. | |
| 10,249,339 B1 | 4/2019 | Mendonsa et al. | |
| 10,818,317 B1* | 10/2020 | Erden | G11B 5/6005 |
| 2004/0027717 A1 | 2/2004 | Alfoqaha et al. | |
| 2004/0037003 A1* | 2/2004 | Tsubota | G11B 5/6005 360/125.39 |
| 2005/0243473 A1* | 11/2005 | Hu | G11B 5/5552 360/294.3 |
| 2006/0092570 A1* | 5/2006 | Payne | G11B 5/3136 360/236.5 |
| 2007/0109686 A1 | 5/2007 | Jose et al. | |
| 2010/0265618 A1* | 10/2010 | Boutaghou | G11B 5/3106 360/234.3 |
| 2012/0206830 A1 | 8/2012 | Gao et al. | |
| 2012/0250177 A1 | 10/2012 | Somanache et al. | |
| 2014/0177405 A1* | 6/2014 | Rejda | G11B 5/255 369/13.02 |

OTHER PUBLICATIONS

U.S. Patent Office issued prosecution for U.S. Appl. No. 16/459,765, filed Jul. 2, 2019, including Notice of Allowance and Fees Due (PTOL-85) dated Aug. 19, 2020, 5 pages; Applicant Initiated Interview Summary dated Jul. 27, 2020, 3 pages; Non-Final Rejection dated May 20, 2020, 8 pages; Restriction Requirement dated Apr. 7, 2020, 6 pages; 22 pages total.

* cited by examiner

MULTI-ACTUATOR DATA STORAGE SYSTEM

CROSS-REFERENCE TO RELATED APPLICATION

This application is a divisional of U.S. application Ser. No. 16/459,765, filed on Jul. 2, 2019, the content of which is hereby incorporated by reference in its entirety.

SUMMARY

In one embodiment, a data storage device is provided. The data storage device includes a data storage medium having a data storage surface. The data storage device also includes a first actuator having a first attached slider with a writer configured to write data on the data storage surface. The writer has a media-confronting surface covered by a first non-magnetic overcoat having a first thickness. The data storage device further includes a second actuator having a second attached slider with at least one user-data reader configured to read user data from the data storage surface and no writer for writing data on the data storage surface. The at least one user-data reader has a media-confronting surface covered by a second non-magnetic overcoat having a second thickness that is less than the first thickness of the first non-magnetic overcoat.

In another embodiment, an apparatus includes a data storage medium having a data storage surface. The apparatus also includes a first actuator having a first attached slider with a writer configured to write data on the data storage surface and a servo reader configured to read servo data from the data storage surface. The servo reader has a media-confronting surface having a first surface area. The apparatus further includes a second actuator having a second attached slider with at least one user-data reader configured to read user data from the data storage surface and no writer for writing data on the data storage surface. The at least one user-data reader has a media-confronting surface having a second surface area that is less than the first surface area of the media-confronting surface of the servo reader.

In yet another embodiment, a device is provided. The device includes a data storage medium having a data storage surface. The device also includes a first actuator having a first attached slider with a writer configured to write data on the data storage surface, and a second actuator having a second attached slider with at least one user-data reader configured to read user data from the data storage surface. The device further includes a controller coupled to the first actuator and the second actuator. The controller is configured to read data from a first track to be overwritten and form second tracks adjacent to the first track using the second attached slider. The controller is also configured to determine noise associated with the first track and interference components from the second tracks, and to obtain, based on the noise and the interference components, a first code for encoding first data to be written onto the first track. The controller is further configured to encode the first data with the first code, store the encoded first data in a buffer memory of the data storage device, and write the encoded first data onto the first track using the first attached slider.

This summary is not intended to describe each disclosed embodiment or every implementation of the multi-actuator data storage system described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to multi-actuator drive systems. Prior to providing details regarding the different embodiments, a description of an illustrative operating environment is provided below.

Figure 1:
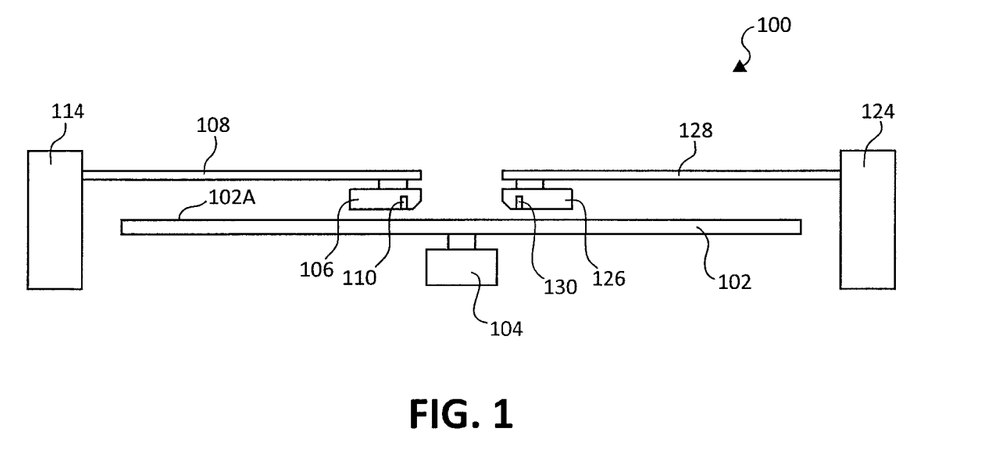
FIG. 1 is a simplified block diagram of a multi-actuator drive in which embodiments of the disclosure may be incorporated.

FIG. 1 shows an illustrative operating environment in which certain embodiments as disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a diagrammatic illustration of a multi-actuator drive 100 in which embodiments of the disclosure may be incorporated. Drive 100 includes at least one disc 102 driven by a spindle motor 104. A first slider (or head) 106 is held over a first surface 102a of the disc 102 by a first actuator arm 108. A first primary actuator 114 moves (e.g., rotates) the first actuator arm 108 to place the first slider 106 over different tracks on the first surface 102a.

The first slider 106 may include one or more transducers 110. In some embodiments, transducers 110 of the first slider 106 include a write transducer (writer) and a read transducer (reader). In general, a reader provides signals in response to changing magnetic fields on the disc 102, and is coupled to a controller (not shown) where the read signals are processed. A writer receives signals from the controller and converts them to magnetic fields that change magnetic orientations of regions on the disk 102. In a heat-assisted magnetic recording (HAMR) implementation, the writer may also include or be coupled to an energy source (e.g., laser diode) that creates a hotspot on a region of the disk 102 currently being recorded.

Drive 100 includes a second slider 126 supported by a second actuator arm 128. The second slider 126 is held over the first surface 102a of the disc 102 by the second actuator arm 128. A second primary actuator 124 causes the second actuator arm 128 to move to different tracks on the first surface 102a. The primary actuators 114 and 124 may move independently of one another, such that actuator arms 108, 128 and sliders 106, 126 are respectively moved independently across the same disk surface 102a.

The second slider 126 may include one or more transducers 130. In some embodiments, transducers 130 of the second slider 126 may include multiple readers. The actuators 114, 124 and sliders 106, 126 can be moved according to scheduling algorithms implemented by the controller to carry out read/write operations in accordance with certain embodiments described further below. However, prior to describing different read/write operations, example embodiments that include reader- and writer-optimized heads are described below.

Figure 2A:
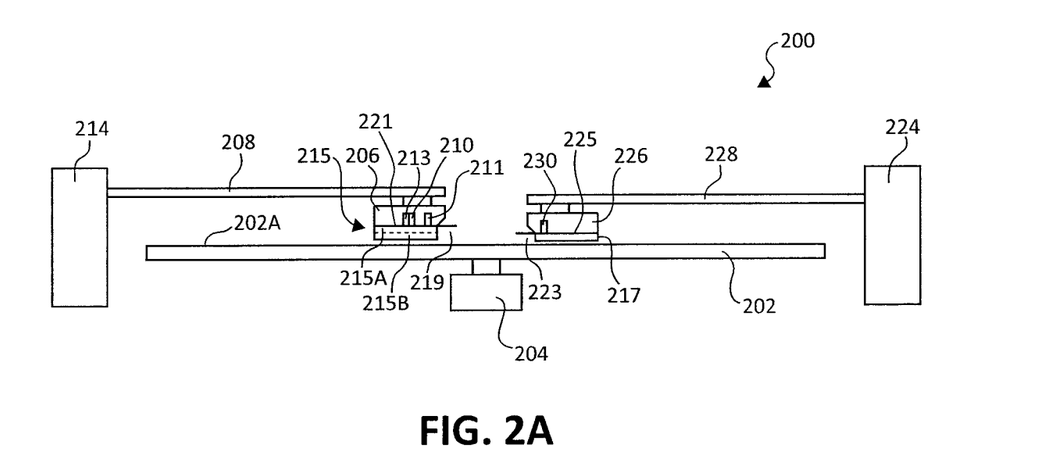
FIG. 2A is a diagrammatic illustration of a multi-actuator drive that includes reader- and writer-optimized heads in accordance with one embodiment.

FIG. 2A is a diagrammatic illustration of a multi-actuator drive 200 that includes reader- and writer-optimized heads in accordance with one embodiment. Like drive 100 (of FIG. 1), drive 200 includes at least one disc 202 driven by a spindle motor 204. Drive 200 also includes a first slider 206 that is held over a first surface 202a of the disc 202 by a first actuator arm 208. A first primary actuator 214 moves (e.g., rotates) the first actuator arm 208 to place the first slider 206 over different tracks on the first surface 202a. Drive 200 further includes a second slider 226 supported by a second actuator arm 228. The second slider 226 is held over the first surface 202a of the disc 202 by the second actuator arm 228. A second primary actuator 224 causes the second actuator arm 228 to move to different tracks on the first surface 202a.

As indicated above, in drive 200, one slider or head is optimized for writing and the other slider or head is optimized for reading. For example, first slider or head 206 is optimized for writing and second slider or head 226 is optimized for reading. In the example embodiment of FIG. 2, first slider 206 includes a writer 210 and a servo reader 211, and second slider 226 includes at least one-user data reader 230 and no writers. As noted above, in a HAMR implementation, the writer (e.g., 210) may also include or be coupled to an energy source (e.g., laser diode) that creates a hotspot on a region of the disc 102 currently being recorded. In FIG. 2, heating-assistance elements are generally represented by reference numeral 213. Due to the inclusion of heating-assistance elements 213, a relatively thick non-magnetic overcoat 215 is employed for first slider 206. In some embodiments, non-magnetic overcoat 215 may be a bi-layer including a first protection overcoat 215a and a second HAMR overcoat 215b.

As indicated above, second slider 226 includes at least one user-data reader 230 and no writers. Due to the absence of writers in second slider 226, heating-assistance elements are also absent. The absence of heating-assistance elements in second slider 226 enables the use of a relatively thin non-magnetic overcoat 217 for slider 226. A thickness of the non-magnetic overcoat 217 may be substantially equal to the thickness of the first protection overcoat 215a. The use of the relatively thin overcoat 217 enables a separation distance 223 between a media-confronting surface 225 of user-data reader 230 and first surface 202a of disc 202 to be smaller than a separation distance 219 between a media-confronting surface 221 of servo reader 211 and first surface 202a of disc 202. This enables user-data reader 230 to read extremely closely spaced user data bits. Further, as will be described in detail below in connection with FIGS. 2B-2D, the greater separation distance 219 for servo reader 211 does not negatively impact the ability of servo reader 211 to read servo fields or tracks because servo fields or tracks are substantially larger than used data fields or tracks, and therefore servo reader 211 may be made substantially larger than user data reader 230 to enable reading from a greater distance without any negative impact on servo read performance.

Figure 2B:
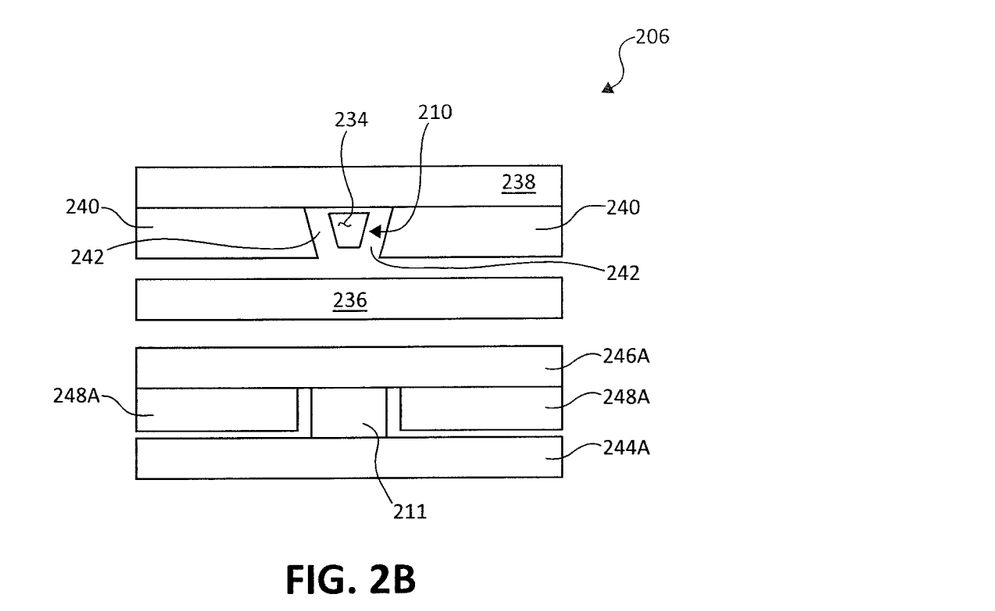
FIGS. 2B and 2C are bearing surface views of first and second sliders, respectively, in accordance with one embodiment.

FIG. 2B is a bearing surface view of a transducer portion of first slider 206 without non-magnetic overcoat 215. The write portion of the transducer includes writer 210 that has a media-confronting surface 234 that may be trapezoidal or triangular in shape. The write portion of the transducer also includes a first return pole 236, a second return pole (or front shield) 238, side write shields 240 and insulator gaps 242. The read portion of the transducer includes servo reader 211 that is positioned between a bottom read shield 244A and a top read shield 246A. Side read shields 248A may also be included on either side of servo reader 211.

Figure 2C:
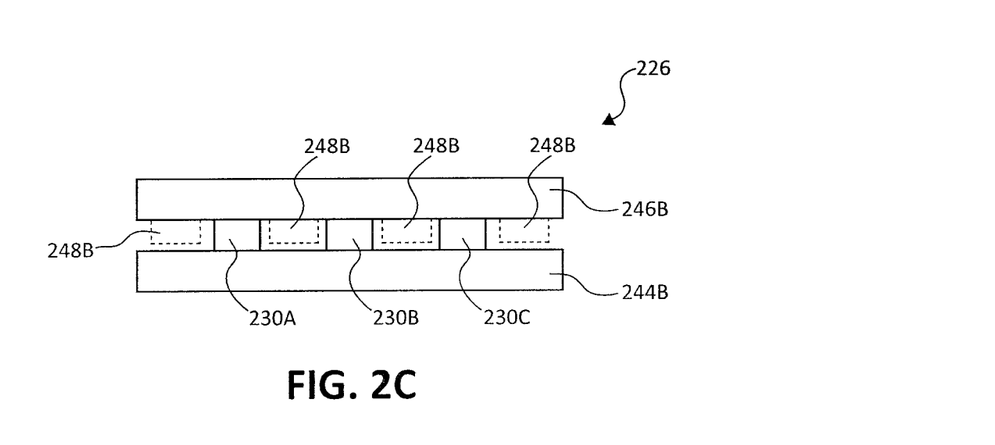

FIG. 2C is a bearing surface view of a transducer portion of second slider 226 without non-magnetic overcoat 217. The transducer portion of second slider 226 may include one or more user-data readers 230 (e.g., 230A, 230B and 230C) positioned between a bottom read shield 244B and a top read shield 246B. Side read shields 248B may also be included as shown in FIG. 2C. The embodiment of FIG. 2C shows the three user-data readers 230A, 230B and 230C in a substantially coplanar arrangement. However, in certain embodiments, readers 230A, 230B and 230C may be stacked one above the other. In general, readers 230A, 230B and 230C may be arranged in any suitable manner.

Since, as indicated above, slider/head 226 is optimized for reading and slider/head 206 is optimized for writing, each of user data readers 230A, 230B and 230C may be substantially smaller than servo reader 211. Thus, the spacing between side read shields 248B (of FIG. 2C) on either side of reader 230A, for example, is substantially less that the spacing between shields 248A.

Figure 2D:
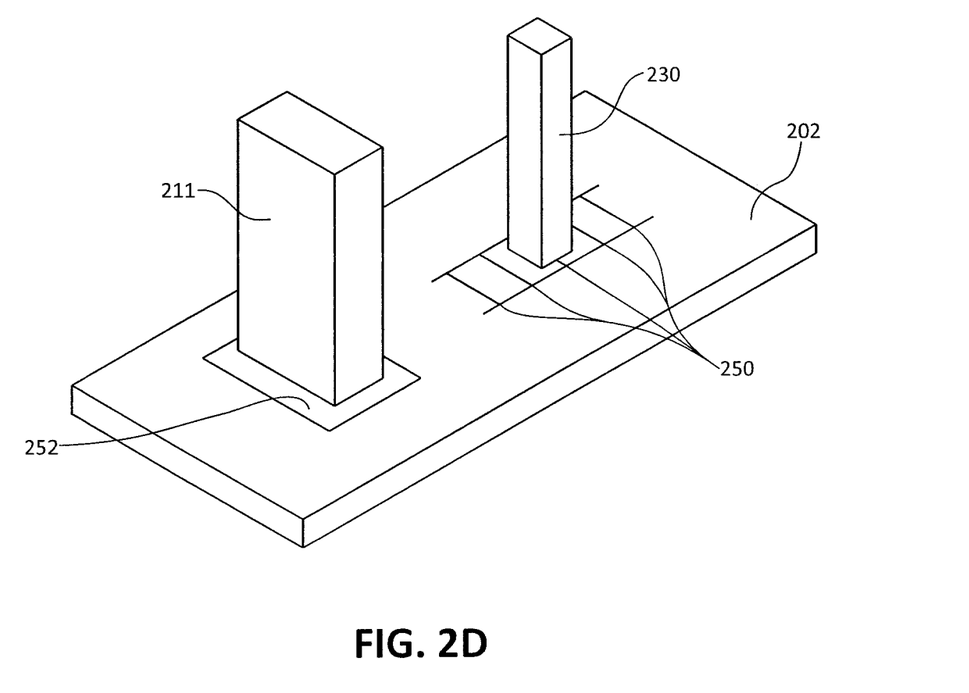
FIG. 2D is a diagrammatic illustration showing a comparison between a servo reader and a user-data reader employed in embodiments of the disclosure.

In general, as shown in FIG. 2D, user-data reader 230 of slider/head 226 is designed with features that enable the reading of closely spaced used data bits 250 from data storage medium 202, and servo reader 211 of slider/head 206 is designed to read relatively large servo fields 252. It should be noted that the user data bits 250 and the servo field 252 are merely representational and are not drawn to scale.

Multi-actuator drive embodiments of the type described above in connection with FIGS. 2A-2D have the following advantages:

Design constraints on the readers (e.g., in slider/head 226) may be relaxed due to no writer present in the head.

Writer fabrication steps (e.g., employed to form slider/head 206) will not degrade readers in a reader array (e.g., in slider/head 226).

Design constraints on the writer (e.g., in slider/head 206) may be relaxed since the main reading is carried out by the reader array (e.g., in slider/head 226).

Writer fabrication steps (e.g., employed to form slider/head 206) may not be as concerned about the reader or locating multiple readers.

Fewer bond pads may be employed for each head/slider since the head optimized for writing (e.g., slider/head 206) does not employ multiple readers and the head optimized for reading (e.g., slider/head 226) has no writer.

In the embodiments shown in FIGS. 2A-2D, the disc 202 may be recorded with conventional tracks (e.g., separated by guard bands) or partially-overlaid adjacent tracks. Examples of the latter include shingled magnetic recording (SMR) and interlaced magnetic recording (IMR). The readers may each be dedicated to a separate track and read just the separate track. In other cases, the two or more readers may overlap two or more tracks and/or have two or more readers reading at least part of the same track. The latter of these arrangements may be used in schemes such as multiple signal/sensor magnetic recording (MSMR) and two-dimensional magnetic recording (TDMR). Example head configurations for MSMR and TDMR are provided below in connection with FIGS. 3A-3C.

Figure 3A:
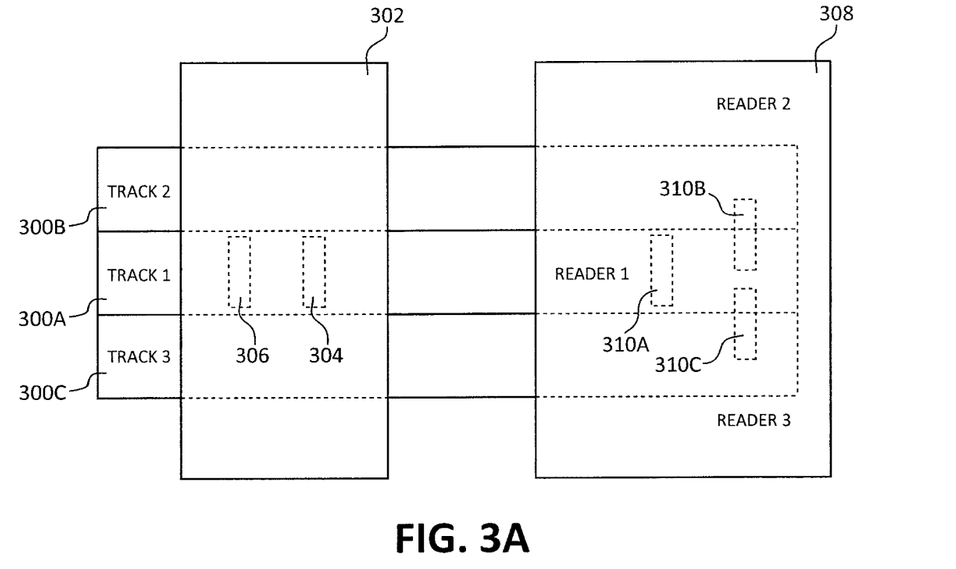
FIGS. 3A-3C are diagrammatic illustrations of sliders in accordance with embodiments of the disclosure.

FIG. 3A is a diagrammatic illustration of an example embodiment in which a first slider/head is optimized for writing and a second slider/head is optimized for reading with a reader array in MSMR mode. In FIG. 3A, tracks 300A, 300B and 300C may be tracks on a data storage surface such as 202a of FIG. 2A. First slider/head 302 includes a writer 304, and a reader 306, which may be configured to read servo fields/tracks to help position writer 304 for writing to tracks 300A, 300B and 300C. Second slider/head 308 includes an array of readers (e.g., three readers 310A, 310B and 310C) that are arranged to help improve or substantially maximize MSMR gain across skew. It should be noted that the use of three readers in the embodiment of FIG. 3A is just one example and, in general, any suitable number of readers may be employed in different applications. In the interest of brevity, additional details regarding MSMR are not provided.

Figure 3B:
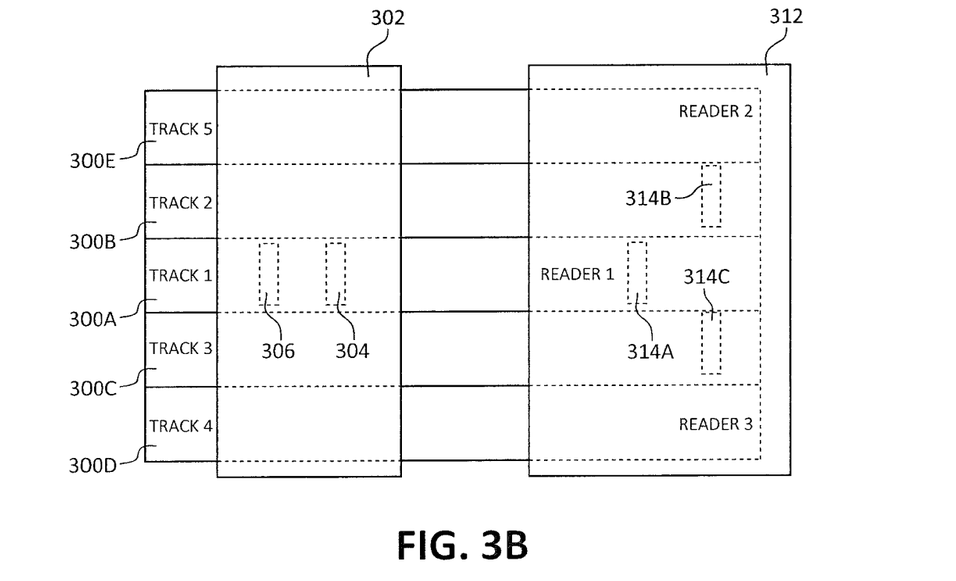
Figure 3C:
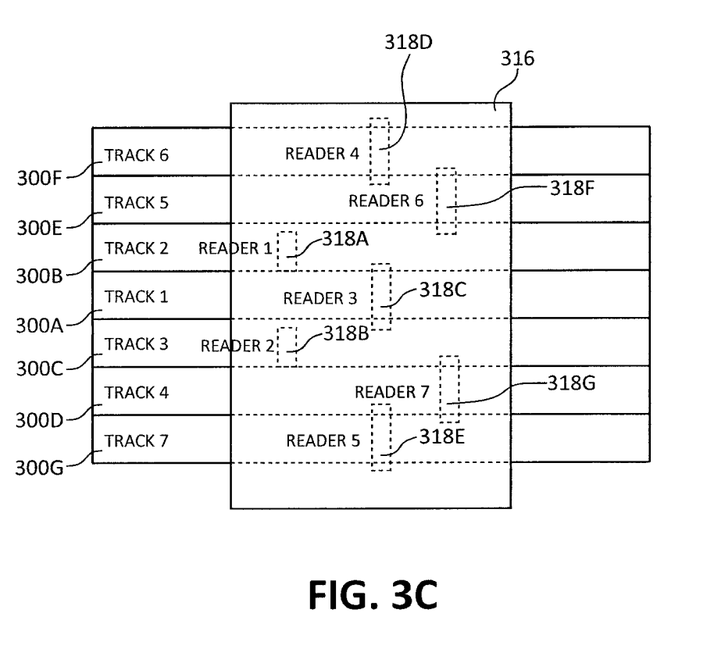

FIG. 3B is a diagrammatic illustration of an example embodiment in which a first slider/head is optimized for writing and a second slider/head is optimized for reading with a reader array arranged to substantially simultaneously read multiple tracks. In FIG. 3B, tracks 300A, 300B, 300C, 300D and 300E may be tracks on a data storage surface such as 202a of FIG. 2A. First slider/head 302 includes a writer 304, and a reader 306, which may be configured to read servo fields/tracks to help position writer 304 for writing to tracks 300A, 300B, 300C, 300D and 300E. Second slider/head 312 includes an array of readers (e.g., three readers 314A, 314B and 314C) that are arranged in a TDMR configuration to substantially simultaneously read multiple tracks (e.g., tracks 300A, 300B and 300C). FIG. 3C illustrates another example showing a second slider/head 316 including an array of seven readers 318A-318G that are arranged in a TDMR configuration to substantially simul-taneously read seven tracks 300A-300G. It should be noted that, in general, for TDMR, at least two readers arranged to read at least two tracks may be employed.

Figure 4:
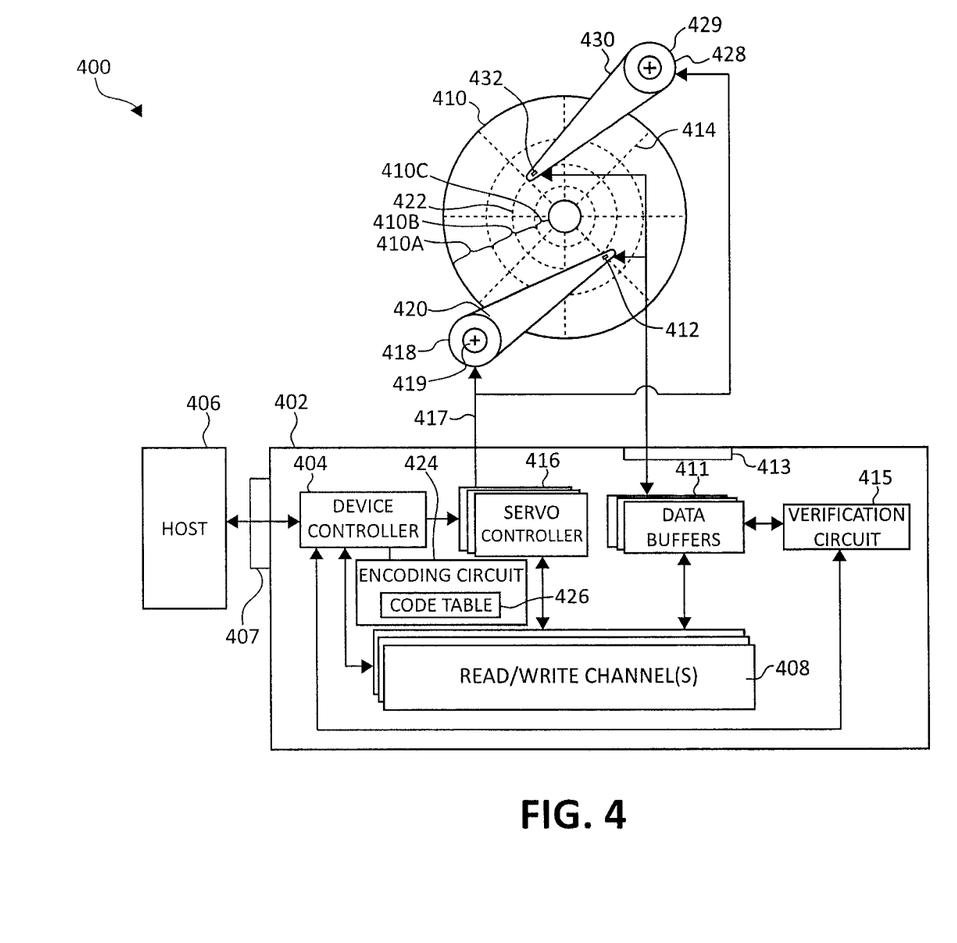
FIG. 4 is a diagrammatic illustration of disc drive that utilizes multiple independent actuators in accordance with an embodiment of the disclosure.

FIG. 4 is a diagrammatic illustration of disc drive 400 that utilizes multiple independent actuators in accordance with an embodiment of the disclosure. Disc drive 400 includes circuitry 402 such as a device controller 404 that processes read and write commands and associated data from a host device 406 via a host interface 407. The host interface 407 includes circuitry that enables electronic communications via standard bus protocols (e.g., SATA, SAS, PCI, etc.). The host device 406 may include any electronic device that can be communicatively coupled to store and retrieve data to/from a data storage device, e.g., a computer, a server, a storage controller. The device controller 404 is coupled to a read/write channel 408 that enables reading from and writing to surfaces of one or more magnetic disks 410. Each disc 410 surface may be divided into regions (e.g., 410a, 410b and 410c), referred to herein as zones, that provide different data transfer rates.

The read/write channel 408 generally converts data between the digital signals processed by the device controller 404 and the analog signals conducted through two or more heads 412, 432 during read and write operations. First head 412 may include a writer and a servo reader, and second head 432 may include at least one user-data reader.

The read/write channel 408 may include analog and digital circuitry such as decoders, timing-recovery units, error correction units, etc. The read/write channels 408 is coupled to the heads 412, 432 via interface circuitry 413 that may include preamplifiers, filters, digital-to-analog converters, analog-to-digital converters, etc. In embodiments in which the second slider/head 432 includes multiple readers, the read/write channel 408 is capable of concurrently processing a plurality of data streams from the multiple readers in the second slider/head 432.

In addition to processing user data, the read/write channel 408 reads servo data from servo fields 414 on the disc 410 via the sliders/heads 412, 432. The servo data are sent to one or more servo controllers 416 that use the data to provide position control signals 417 to the actuators, as represented by voice coil motors (VCMs) 418 and 428. The VCM 418 rotates an arm 420 upon which head 412 is mounted in response to the control signals 417.

The VCM 418 may be a stacked or split actuator, in which case two VCM parts are configured to independently rotate different arms about a common axis 419. In such a case, another head (not shown) will access data on the opposite disk surface simultaneously with that of head 412, and this other head may be coupled to circuitry 402 in a manner similar to that of illustrated head 412. A second actuator, e.g., VCM 428, may independently rotate a second arm 430 about a second axis 429. Corresponding second slider/head 432 may be rotated by the VCM 428, and may operate under commands from the one or more servo controllers 416.

The circuitry 402 may include a multiplicity of data buffers 411 each associated with one of the heads 412, 432. Disc drive 400 is capable of carrying out read-very-write or idle read-after-write (IRAW) operations. As part of a read-verify-write operation, data to be written to track 422 by head 412, for example, is buffered in a data buffer 411. After writing to track 422 by first slider/head 412, second slider/head 432 is moved to track 422 and the data written by head 412 is read by head 432. In such embodiments, the device controller 404 includes or is coupled to a verification circuit 415 that verifies that the data was properly written to track 422 by head 412. The verification circuit 415 can compare a writeability metric, such as bit error rate (BER), of the written data to a threshold (e.g., a minimum BER) to determine if the data was properly written to track 422. If so, the data buffered in data buffer 411 is no longer utilized and is released. If, on the other hand, the verification circuit 415 determines that the data was not properly written to track 422, a subsequent write operation is performed by rewriting the data stored in the buffer 411 to track 422.

A subsequent read-after-write operation is performed followed by another verification check by the verification circuit 415. This process may be repeated a predetermined number of times (e.g., 3-6 times) until the data is successfully written to track 422 or the verification circuit 415 indicates that data cannot be properly written to the target sectors of track 422. According to some embodiments, the sectors of track 422 that could not be successfully written to can be identified as non-recordable sectors. These sectors can be avoided for subsequent write operations. Sectors identified as spare sectors on the disc 410 can be allocated as working sectors for data storage at least equal in number to the non-recordable sectors.

The above-described read-verify-write operation may be carried out when second head 432 includes a single user-data reader. In such embodiments, data to be written is typically encoded with a generic code selected based on the zone 410a, 410b, 410c in which the data is to be written. Thus, the read-verify-write process described above involves simply overwriting a track with data encoded with a generic code, and verifying the data that was written.

As indicated above, in certain embodiments, second head 432 may include multiple user-data readers. In such embodiments, a track to be overwritten and its adjacent tracks may be simultaneously read by the multiple readers before the track is overwritten. This provides the ability to quantify noise components associated with the track to be overwritten along with the ability to determine interference components form adjacent tracks. The determined noise and interference allows for dynamically obtaining suitable codes for encoding the data to be written on the track of interest. In some embodiments, to enable dynamic code selection, device controller 404 may include or be coupled to encoding circuitry 424 having a code table 426 that includes different codes computed, for example, during manufacture of the drive 400. The different codes may be computed during drive 400 manufacture by writing to a number of different tracks, reading each of the written tracks and adjacent tracks with the multiple user-data readers of the second head 432, determining the noise and interference components for each of the written tracks, and computing different codes for the different noise and interference components associated with the different tracks. The codes calculated during manufacture of the drive 400 are stored in the code table 426 and dynamically obtained during write operations in the field. The capability of simultaneously reading multiple tracks including the track to be overwritten and the adjacent tracks also provides the ability to store data from the adjacent tracks before the track of interest is overwritten. This enables verification of the adjacent track data after the track of interest is overwritten. A read-verify-write operation using multiple readers is described below in connection with FIG. 5.

Figure 5:
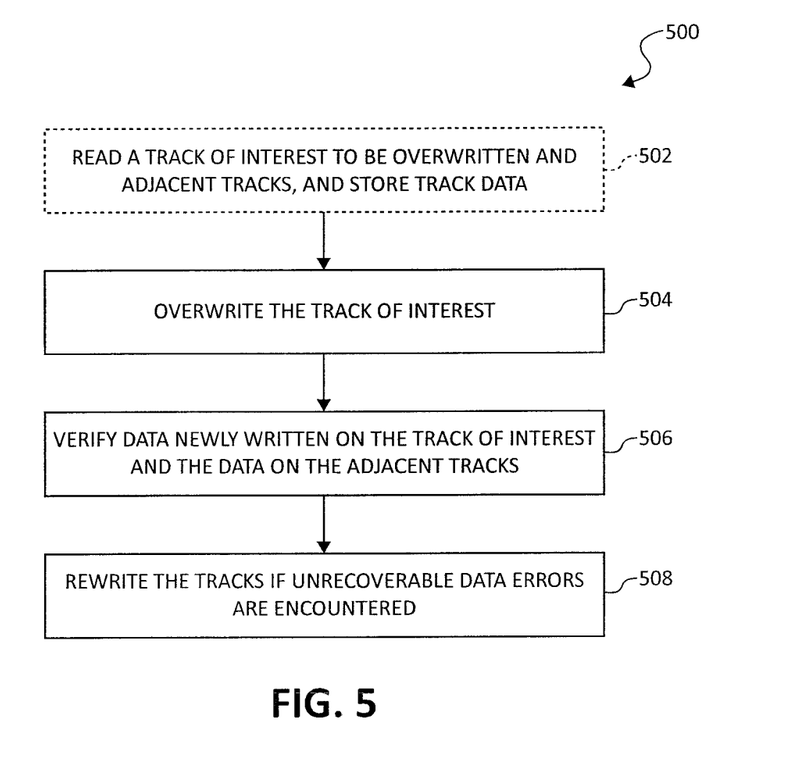
FIG. 5 is a flowchart of a first method embodiment.

FIG. 5 is a flowchart that illustrates a read-very-write or IRAW method 500 that may be performed by using a writer-optimized head and a reader-optimized head that are coupled to respective first and second actuators and positioned over a same disc surface as shown in FIG. 2A, for example. At 502, a track of interest to be overwritten and adjacent tracks are read by the reader-optimized head, and the read data is stored in a buffer memory that may be separate from the disc(s). It should be noted that the track to be overwritten is read along with the adjacent tracks in order to characterize noise and a channel response for the read tracks, so that a channel code suitable for the characterized noise and channel response may be selected to encode new data to be written on the track of interest. It should also be noted that such a read operation may be carried out when the reader-optimized head includes multiple readers. If the reader-optimized head includes a single reader, 402 may not be performed. At 404, the track of interest is overwritten with the encoded new data by the writer-optimized head. A copy of the encoded new data is also retained in the buffer memory. At 406, a read operation by the reader-optimized head is carried out to verify the encoded data newly written on the track of interest and the data on the adjacent tracks. The newly written data is verified against the encoded new data retained in the buffer memory, and the data on the adjacent tracks after the overwriting of the track of interest is verified against the stored data from the adjacent tracks read before the writing of the track of interest. In an embodiment in which the reader-optimized head includes a single reader, verification of adjacent track data may not be performed. At 408, the tracks are rewritten if unrecoverable data errors are encountered.

The read-verify-write operation described above in connection with FIG. 4 reduces a signal-to-noise ratio (SNR) margin for the channel if poorly written tracks may be overwritten. Also, no write errors may be present during read back. Further, no extra disc revolutions may be employed when verifying one written track with the read array. However, extra disc revolutions may be employed for adjacent tracks to carry out a read-before-write or to rewrite.

Figure 6:
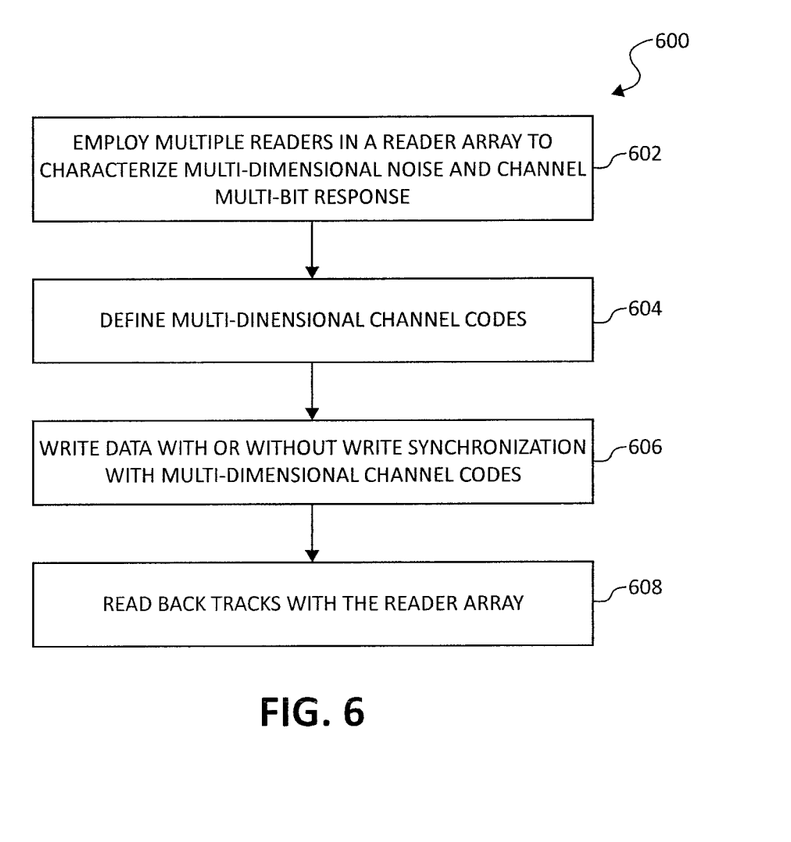
FIG. 6 is a flowchart of a second method embodiment.

FIG. 6 is a flowchart of a method 600 in which multi-dimensional channel codes are obtained in real-time in accordance with one embodiment. At 602, multiple readers (e.g., a reader array) in a single slider are employed to substantially simultaneously read multiple tracks, and to characterize multi-dimensional (e.g., two-dimensional) noise and channel multi-bit (e.g., dibit) response. At 604, multi-bit channel codes are defined or obtained. At 606, data encoded with the multi-dimensional (e.g., two-dimensional) channel codes are written with or without write synchronization. At 608, the written data are read from the tracks with the reader array.

Advantages of the method of FIG. 6 include:
The ability to read multiple tracks at the same time with the reader array.
Read-verify-write or IRAW are possible.
Multi-dimensional (e.g., two-dimensional) encoded tracks are read and decoded. This provides for:
Inter-track interference cancellation.
Each track may resemble an isolated track with no interference from adjacent tracks.
No write errors to deal with when read-very-write is employed.
Reduces SNR and margin for the channel to decode tracks.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a data storage medium having a data storage surface;
   a first actuator having a first attached slider with a writer configured to write data on the data storage surface and a servo reader configured to read servo data from the data storage surface, wherein the first slider comprises a first overcoat having a first thickness; and
   a second actuator having a second attached slider with at least one user-data reader configured to read user data from the data storage surface and no writer for writing data on the data storage surface, wherein the second slider comprises a second overcoat having a second thickness that is less than the first thickness of the first overcoat.

2. The apparatus of claim 1 and further comprising a controller coupled to the first actuator and the second actuator and configured to:
   read data from a first track on the data storage surface to be overwritten and form second tracks on the data storage surface adjacent to the first track using the second attached slider;
   determine noise associated with the first track and interference components from the second tracks;
   obtain, based on the noise and the interference components, a first code for encoding first data to be written onto the first track;
   encode the first data with the first code and store the encoded first data in a buffer memory of the apparatus; and
   write the encoded first data onto the first track using the first attached slider.

3. The apparatus of claim 2 and wherein the first code is one of a plurality of codes computed by the controller during manufacture of the apparatus.

4. The apparatus of claim 3 and wherein the controller is further configured to:
   write data, using the first attached slider, to a plurality of different third tracks on the data storage surface;
   read, using the second attached slider, each of the plurality of third written tracks and fourth tracks on the data storage surface adjacent to each third written track;
   determine noise associated with each third written track and interference components from the fourth tracks; and
   compute different codes from the noise associated with each third written track and from the interference components from the fourth tracks, the different codes forming the plurality of codes.

5. The apparatus of claim 2 and wherein the controller is further configured to store the data read from the adjacent second tracks into the buffer memory.

6. The apparatus of claim 2 and wherein the controller is further configured to:
   read the encoded first data from the first track using the second attached slider;
   compare the read encoded first data with the encoded first data from the buffer memory;
   rewrite the first encoded data from the buffer memory onto the first track when the comparison shows one or more errors.

7. The apparatus of claim 5 and wherein the controller is further configured to:
   read, using the second attached slider, the data from the second tracks after the encoded first data is written on the first track;
   compare the read form the second tracks after the encoded first data is written on the first track with data read from the adjacent second tracks stored in the buffer memory;
   rewrite the data from the adjacent second tracks in the buffer memory onto the adjacent second tracks when the comparison shows one or more errors.

8. The apparatus of claim 1 and wherein the first attached slider is configured to carry out heat-assisted magnetic recording.

9. The apparatus of claim 1 and wherein the second attached slider comprises a plurality of user-data readers configured to substantially simultaneously read data from a plurality of tracks on the data storage surface.

10. The apparatus of claim 1 and wherein:
    the servo reader comprises a media-confronting surface having a first surface area; and
    the at least one user-data reader comprises a media-confronting surface having a second surface area that is less than the first surface area of the media-confronting surface of the servo reader.

11. The apparatus of claim 1 and wherein:
    the data storage surface comprises concentric tracks;

the writer is configured to write data on the concentric tracks; and the at least one user-data reader is configured to read user data from the concentric tracks.

12. The apparatus of claim 1 and wherein:

the data storage surface comprises concentric tracks with servo and user data portions; and the at least one user-data reader is configured to interact with the concentric tracks.

13. The apparatus of claim 1 and wherein:

the data storage surface comprises concentric tracks; and the at least one user-data reader comprises at least two user-data readers configured to read at least part of a same track of the concentric tracks.

14. The apparatus of claim 1 and wherein:

the data storage surface comprises concentric tracks; and the at least one user-data reader comprises at least two user-data readers configured to read separate tracks of the concentric tracks.

15. The apparatus of claim 1 and wherein the at least one user data reader comprises a reader array configured in a multiple sensor magnetic recording mode.

16. The apparatus of claim 1 and wherein the at least one user data reader comprises a reader array configured in a two-dimensional magnetic recording mode.

* * * * *